April 18, 1950        H. F. HUNICK        2,504,197
VARIABLE ANGLE TRANSMISSION MEANS
Filed March 8, 1945
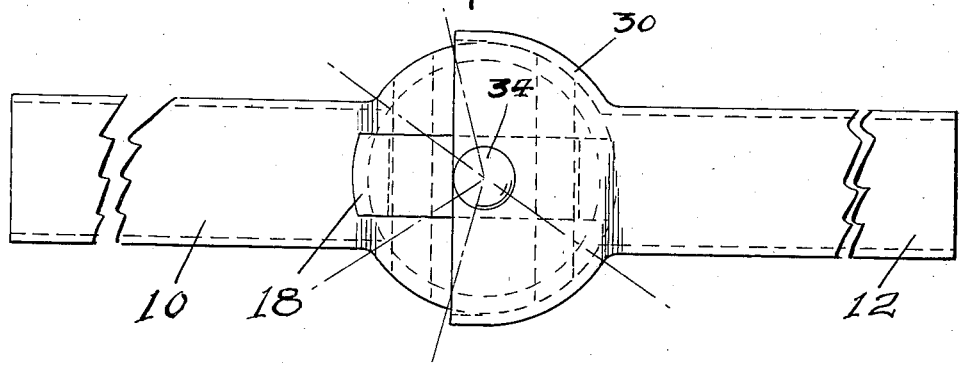
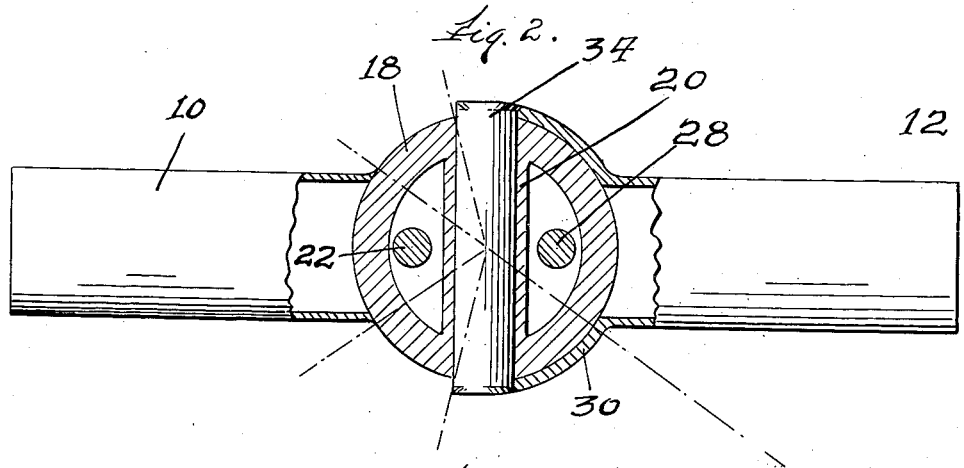
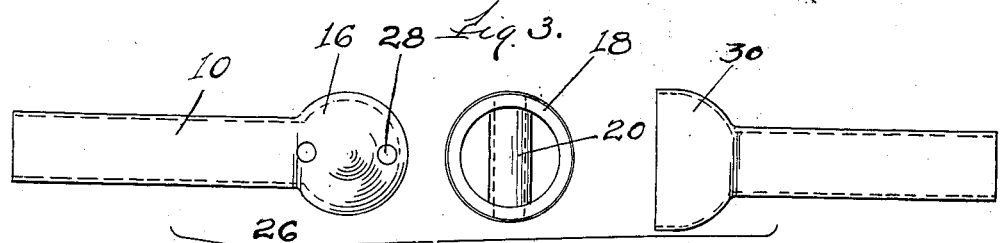
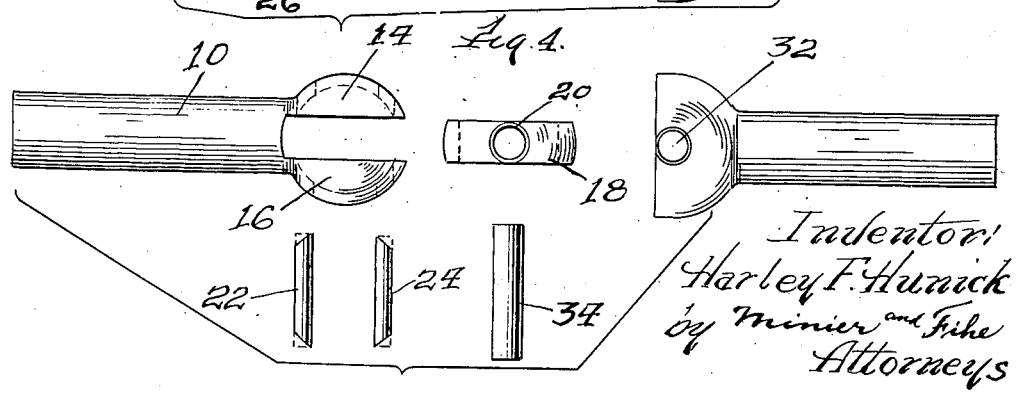
Inventor:
Harley F. Hunick
by Minier and Fike
Attorneys Patented Apr. 18, 1950

2,504,197

UNITED STATES PATENT OFFICE 2,504,197

VARIABLE ANGLE TRANSMISSION MEANS

Harley F. Hunick, San Pedro, Calif.

Application March 8, 1945, Serial No. 581,623

3 Claims. (Cl. 64—7)

This invention relates to an improved variable angle transmission means, and has for one of its principal objects the provision of a device whereby rotative motion may be transmitted at an angle.

One of the important objects of this invention is to provide in an element for transmitting motion at angles, means which employs the ball and socket form usual in universal joints, and which will be especially effective in accomplishing the desired rotative effect from various angles.

Another important object of the invention is to provide a variable angle transmission element which is of light weight, thereby rendering it peculiarly adaptable for airplane construction, and which also presents a greater bearing surface than the usual transmission joint, whereby less vibration occurs.

Other and further important objects of the invention will be apparent from the disclosures in the accompanying drawings and following specification.

The invention, in a preferred form, is shown in the drawings and hereinafter more fully described.

In the drawings:

Figure 1 is a side elevation of the improved variable angle transmission means of this invention, certain of the interior parts being shown in dash lines and the various angles through which the device may be operated being indicated in dot and dash lines.

Figure 2 is a sectional view of the device, taken through the center of Figure 1.

Figure 3 is a disassembled view of the apparatus, showing the component parts.

Figure 4 is an exploded view, illustrating various elements in their completed relationship to each other.

As shown in the drawings:

The reference numerals 10 and 12 indicate generally the two shafts which, when joined, form the variable angle transmission means of this invention. These shafts are preferably tubes, as illustrated.

As shown, the tube or shaft 10 has integral therewith a male element which is spherical in shape and bifurcated, as best shown at 14 and 16 in Figure 4.

Adapted to be fitted into the space between the bifurcations 14 and 16 is an annular element 18, which is provided with an integral sleeve 20, extending diametrically thereacross. This annular element is fitted into the space between the portions 14 and 16 and then held in position by means of pins 22 and 24, which are passed through corresponding openings 26 and 28 respectively in the bifurcations 14 and 16. These pins 22 and 24 pass through the spaces between the sleeve 20 and the periphery of the annular element 18, and sufficient motion is allowed so as to provide for at least a 30-degree angle.

Adapted to be fitted onto the assembled bifurcations 14 and 16 and the annulus 18 is a socket or female element 30 which is integral with the tube or shaft 12. This element has a line of openings 32 therein, through which openings is adapted to be fitted a pin 34 which also passes through the sleeve 20 in the annulus 18 after the sleeve 20 has been aligned with the openings 32. This pin 34 is then fastened in position by riveting or the like, whereupon a completely assembled and unitary ball and socket joint or variable angle transmission means results.

The device is of course a permanent assembly, and can be constructed very economically in that practically all of the parts can be readily formed of stampings, whereas the usual universal joint is of much more costly construction. The device may also be made smaller than the ordinary universal joint, and can conveniently be made in most any size.

The angular variation can be up to 30 degrees in any direction, and if a greater angle of transmission is desired, two of these devices can be coupled. The most effective coupling results when they are positioned a relatively short distance apart.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A variable angle transmission means comprising male and female elements, the male element including a shaft, a pair of semi-spherical bifurcations integral with the shaft, an annulus fitted between the bifurcations, means for holding the annulus in rotative position, the female element surmounting the assembled bifurcations and annulus, the means for holding the annulus in rotative position in the bifurcations comprising a pair of pins fitted across the bifurcations and through the annulus, a hollow sleeve integral with the annulus and pisitioned diametrically thereacross, means for fastening the female element in position, said means comprising a pin passing through the hollow sleeve of the annulus in rotative relationship therewith, the ends of the pin being fixedly mounted in openings in the female element.

2. A variable angle transmission means comprising male and female elements, the male element including a shaft, a pair of semi-spherical bifurcations integral with the shaft, an annulus fitted between the bifurcations, a pair of pins for holding the annulus in rotative position with respect to the bifurcations, said female element surmounting the assembled bifurcations and annulus, means for holding the female element in rotative position with respect to the assembled bifurcations and annulus, said means comprising a pin and a hollow sleeve integral with the annulus and positioned diametrically thereacross for reception of the pin for fastening the female element in position, the ends of the pin extending beyond the sleeve and fixed into the female element.

3. A variable angle transmission means comprising male and female elements, the male element including a shaft, a pair of substantially semi-spherical bifurcations integral with the shaft, an annulus comprising a unitary section fitted between the bifurcations, means for holding the annulus in rotative position in the bifurcations, said female element surmounting the assembled bifurcations and annulus, said means for holding the annulus in rotative position in the bifurcations comprising a pair of pins, a hollow sleeve integral with the annulus and positioned diametrically thereacross, said pins being positioned one on each side of the sleeve and between said sleeve and the inner periphery of the annulus, and means for fastening the female element in position, said means comprising a pin passing through the hollow sleeve of the annulus in rotative relationship therewith.

HARLEY F. HUNICK.

REFERENCES CITED

The following references are of record in the file of this patent:

UNITED STATES PATENTS

| Number | Name | Date |
|---|---|---|
| 791,087 | Deutsch | May 30, 1905 |
| 1,037,427 | Brush | Sept. 3, 1912 |
| 1,623,199 | Owens | Apr. 5, 1927 |
| 1,686,695 | Heon | Oct. 9, 1928 |